2 Sheets—Sheet 1.
T. ALDEN.
Street Sweeper.
No. 14,341.
Patented March 4, 1856.
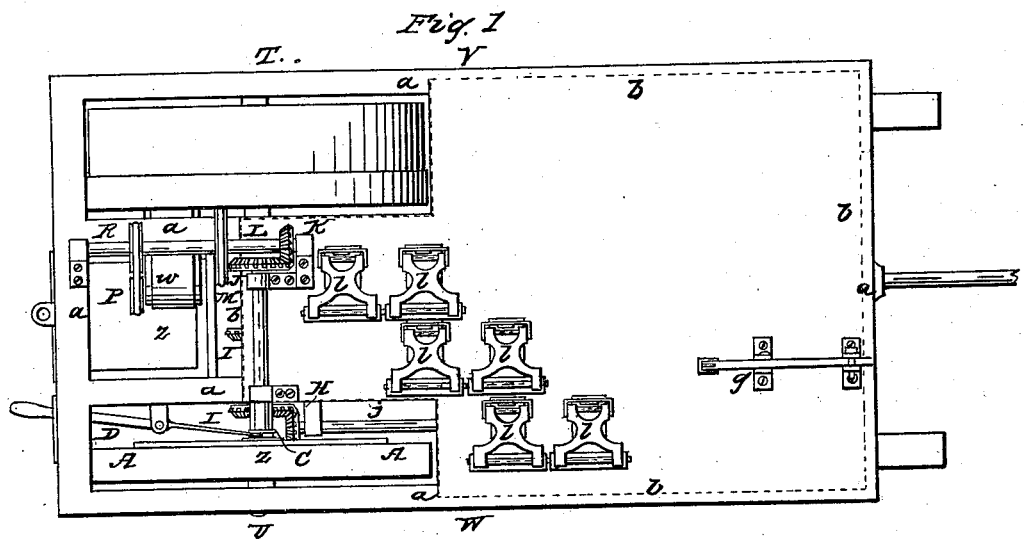
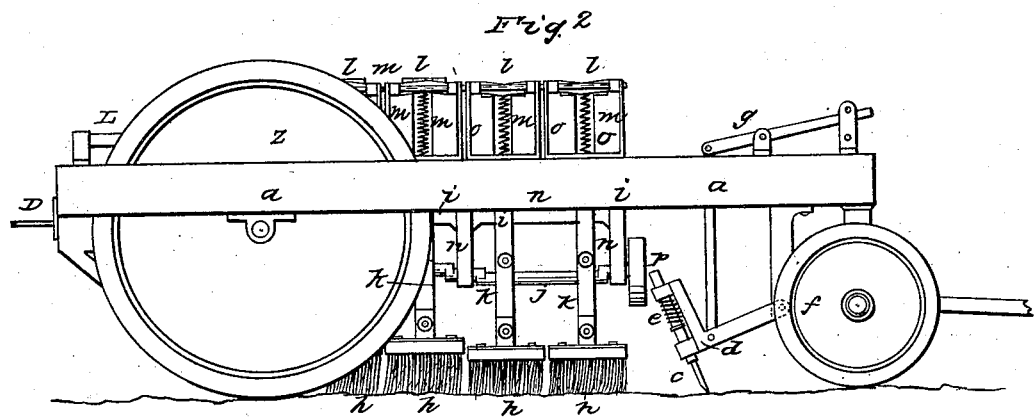

T. ALDEN.
Street Sweeper.
No. 14,341.
2 Sheets—Sheet 2.
Patented March 4, 1856.
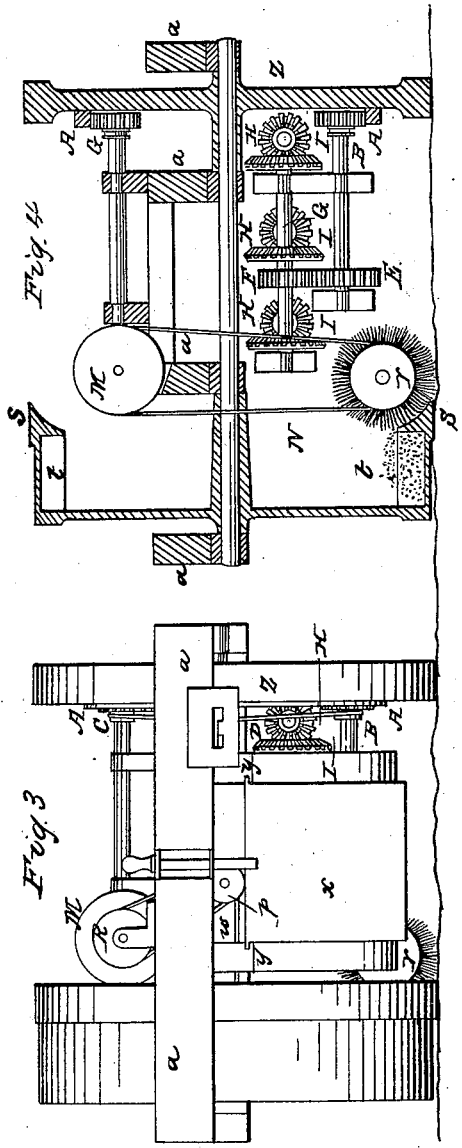
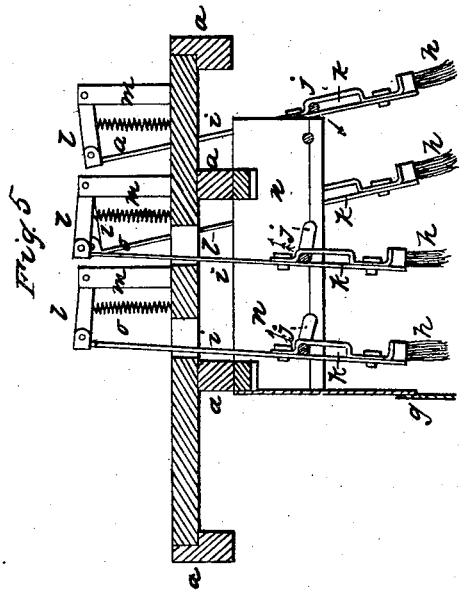
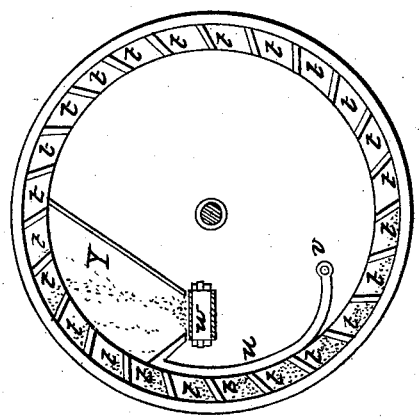
Witnesses

UNITED STATES PATENT OFFICE.

TIMOTHY ALDEN, OF NEW YORK, N. Y.

MACHINE FOR SWEEPING STREETS.

Specification of Letters Patent No. 14,341, dated March 4, 1856.

*To all whom it may concern:*

Be it known that I, TIMOTHY ALDEN, of the city of New York, in the county and State of New York, have invented a new and useful Machine for Sweeping and Cleaning Streets; and I do hereby declare that the following is a full, clear, and exact description of the same, reference being had to the annexed drawing, making a part of this specification, in which—

Figure 1 is a vertical or plan view; Fig. 2, a longitudinal elevation; Fig. 3, a back elevation; Fig. 4, a transverse section between the letters T and U on Fig. 1; Fig. 5, a transverse section between the letters V and W on Fig. 1, and Fig. 6 is a plan of the left back wheel of the machine, which serves as a collector and elevator for the dirt swept from the street.

The same letters of reference, wherever they occur, refer to like parts in the several drawings.

The entire machine forms a four wheeled carriage to be drawn by one or more horses, the front wheels being made like those of an ordinary wagon, and all the different parts of the machine are attached to a strong wooden frame —*a*— the top of which is planked over in such parts as are designated by the dotted line —*b*— in Fig. 1. Directly back of the front wheels are a series of narrow scrapers —*c*— extending across the carriage. These scrapers are attached to rods which slide up and down in an iron frame —*d*— and each has a spiral spring —*e*— which presses it downward. The frame —*d*— swings on a pivot —*f*— and as its weight bears the scrapers upon the ground the spiral springs cause each of them to adapt itself to the inequalities of the pavement.

*g* is a lever connected with the frame containing the scrapers by a rod or chain, for the purpose of raising it from the ground when the condition of the streets is such as not to require the use of the scrapers, their purpose being to loosen and scatter all hard and thick masses of dirt before they come in contact with the brooms hereinafter described.

The dirt is collected from the streets by a series of brooms —*h*— having handles about four feet in length, made of thin, flat bars of steel or iron —*i*—. About one foot above the brooms their handles are attached to three cranks —*j*— by sliding boxes —*k*—. Into these boxes fit the journals of the cranks, having shoulders on either side. These journals have a compound motion in the boxes of the handles, that is, a turning and sliding motion at the same time. The upper ends of the broom handles are pivoted to the outer ends of a series of working levers —*l*— having their fixed or stationary opposite ends pivoted to a corresponding number of uprights —*m*— elevated from and secured to the platform of the carriage. The cranks turn in an iron frame work —*n*— and revolve in the direction of the arrows (see Fig. 5), showing half the number of brooms just rising from the pavement and the other half just touching it in their descent. As the cranks revolve these last will be moved from right to left over the pavement, and as the extremities of the cranks to which the brooms are attached descend below their axles, the journals which fit into the oblong boxes or sockets —*k*— on the handles will slide downward in said boxes or sockets, leaving the brooms free to adjust themselves to the inequalities of the pavement, against which they are firmly pressed by spiral springs —*o*— attached to the working levers —*l*—. On the forward end of the axle of each crank is a balance wheel —*p*— to equalize the power required to revolve them. The brooms are arranged diagonally across the carriage, as shown by the working levers —*l*— in Fig. 1, and all the dirt is collected in a row just within the left wheels of the carriage, where a guard board —*q*— is placed to prevent its being thrown too far by the action of the brooms. The dirt being swept into a row by the brooms attached to the cranks, it next comes in contact with the circular brush —*r*— and is swept into the left back wheel of the machine at the point where it touches the ground. A sectional view of this wheel is seen in Fig. 4, *s* being a continuous rim beveled to conform to the circle of the revolving brush. Within this rim are a succession of buckets at regular intervals around the whole circumference of the wheel; they are placed in an angular position, as shown in Fig. 6, marked with the letter *t* respectively. The dirt being deposited within these buckets, it is carried up by the revolution of the wheel as it rolls over the ground. As the dirt ascends it is confined by a shieldboard —*u*— hanging upon a pivot —*v*— which bears against the edge of the buckets, but yields to any pressure which it may receive from large substances in the wheel. When the dirt reaches the top of this shield board it falls from the buckets upon guide boards, or what may be called a hopper —Y,— and thence upon a revolving endless band —w,— by which it is carried from within the elevating wheel and deposited in a box —X— between the two back wheels. This box rests upon sliding ways on each side —y— and is intended to be removed and emptied, or exchanged for another, as may be convenient.

The right back wheel —Z— serves as the driver to propel the brooms, the circular brush and the endless band described above.

A is a cog rim fixed to the wheel—Z—. Into the cog rim —A— work two cog wheels. The one at the bottom —B— drives the cranks which move the brooms, and the one at the top —C— moves the circular brush and the endless band. Both of the wheels —B and C— slide upon their shafts, and can be freed from the cog rim —A— by the lever —D. On the same shaft with the cog wheel —B— is the cog wheel —E— which works into the cog wheel —F— on the shaft —G. On the shaft —G— are three bevel cog wheels —I— which work into three bevel cog wheels —H— on the axles of the three cranks which move the brooms. On the same shaft with the cog wheel C is the bevel cog wheel —J— which works into the bevel cog wheel K on the shaft L. On the shaft L is the pulley M, which is connected by the band N to the circular brush r. Also on the shaft L is the pulley R, which connects by a band with the pulley —P— which moves the endless band that conveys the dirt from within the elevating wheel.

What I claim as my invention and desire to secure by Letters Patent is:

1. The arrangement and use of the sliding boxes —k, springs —o,— and levers —l,— in combination with the broom handles and crank shaft, substantially as herein before set forth, for the purpose of making the brooms self-adjustable, under all circumstances, to overcome the inequalities of the pavement to be swept.

2. I also claim the use of the guard board q, arranged longitudinally of the machine for the purpose of collecting the dirt in windrows, in combination with the brooms for sweeping the dirt against the said guard board, substantially as herein before set forth.

3. I also claim the use of the collecting and elevating wheel s in combination with the guard board —q— and revolving brush —r— arranged and used substantially as set forth, and for the purposes described.

4. I do also claim the use and arrangement of the shield board —u— for the purpose of holding the dirt within the buckets of the collecting and elevating wheel till ready to be discharged therefrom, hopper boards —Y— and endless carrying band —w— in combination with the collecting wheel, the said combination of parts arranged and operating substantially as herein before set forth.

TIMOTHY ALDEN.

Witnesses:
H. W. ALDEN,
C. W. ALDEN.